T. A. NELSON.
PRESSURE GAGE.
APPLICATION FILED APR. 7, 1911.
1,322,463.
Patented Nov. 18, 1919.
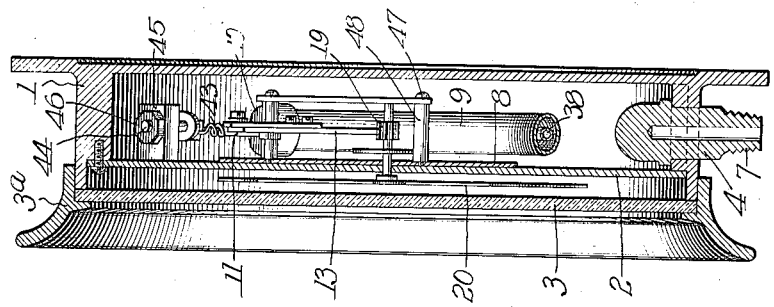
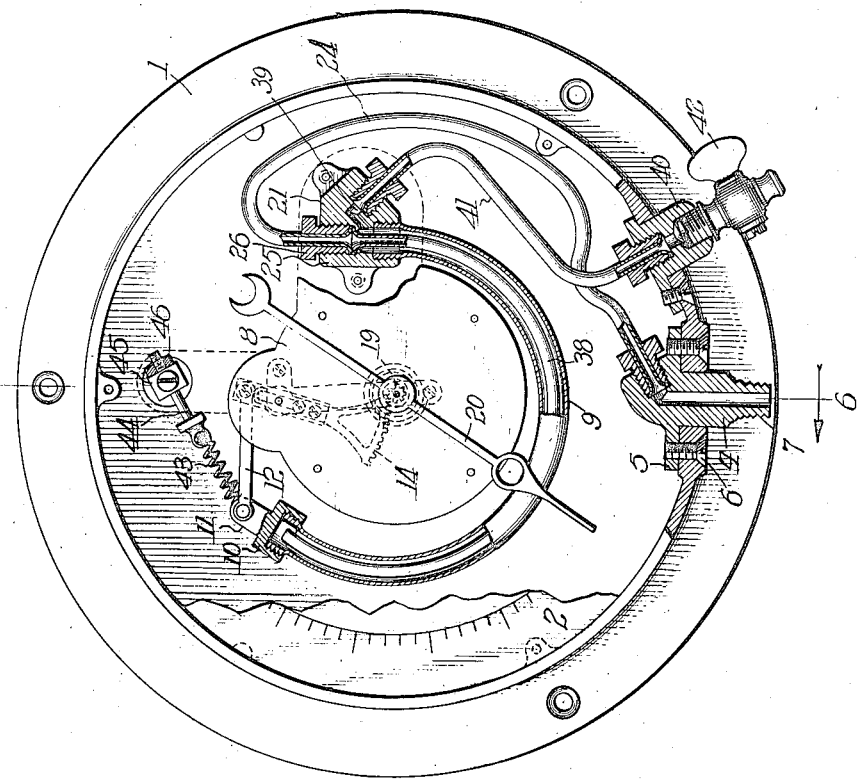
Witnesses:
Robert H. Weir
W. Perry Hahn
Inventor
Thomas A. Nelson
Jones, Addington, Ames & Seibold
Attys.

UNITED STATES PATENT OFFICE.

THOMAS A. NELSON, OF CHICAGO, ILLINOIS.

PRESSURE-GAGE.

1,322,463.

Specification of Letters Patent.   Patented Nov. 18, 1919.

Application filed April 7, 1911.  Serial No. 619,563.

*To all whom it may concern:*

Be it known that I, Thomas A. Nelson, a citizen of the United States, residing at Chicago, in the county of Cook and State of Illinois, have invented new and useful Improvements in Pressure-Gages, of which the following is a full, clear, concise, and exact description, reference being had to the accompanying drawing, forming a part of this specification.

My invention relates to improvements in gages.

It is one of the objects of my invention to provide a pressure vacuum or compound gage which will read accurately under all conditions. Heretofore in the commercial art pressure gages have been so constructed that in fastening them in position on the end of the pressure pipe the connections are strained or twisted to such an extent that the Bourdon tube has been thrown out and the gage caused to register inaccurately, sometimes as much as five or ten pounds or more. In fact, most gages as now commercially constructed are not accurate after they have once been placed in position, due to this very fact that they are strained in being secured to the pressure pipe. It is one of the objects of my invention to overcome the above defects.

Another object of my invention is to provide a gage in which the parts may be readily removed for the purpose of inspection or repair without disconnecting the entire gage from the pressure pipe or removing the casing from position. Other objects and advantages of my invention will appear in the following specification and drawings.

For the purpose of disclosing my invention I have illustrated certain embodiments thereof in the accompanying drawings. In said drawings,—

Figure 1 is a sectional view of a gage embodying my invention; and, Fig. 2 is a sectional view taken on the line 6—6 of Fig. 1.

In the embodiment of my invention illustrated I provide an inclosing casing 1 having a dial face 2 and glass cover 3. At the lower part of the casing the side is drilled to form an opening to permit the extension therethrough of a pipe fitting 4. This pipe fitting is provided with a pair of flanges 5 into which are adapted to screw the retaining screws 6 to hold the pipe fitting in place and the extremity of the fitting is screw threaded, as at 7, to connect with the pressure pipe.

The operating mechanism of the gage is all mounted upon a single independent plate 8 which may be secured either to the back of the casing or may be secured to the front dial of the casing, as shown. This plate carries the usual operating mechanism of a gage, which consists of a Bourdon tube 9 closed at one end by a cap 10, which cap is provided with an ear 11 connected by a link 12 with the stem 13 of a segmental rack 14. The segmental rack is preferably pivoted between the upper plate 16 and the plate 8 and the stem 13 thereof is made in two parts, slotted and secured together by set screws to permit the length of the stem to be adjusted for varying conditions. This rack 14 is adapted to mesh with a pinion 19 mounted on a stem arranged between two plates and projecting through the dial plate to carry the pointer 20. A hair spring, one end of which is connected to one of the posts of the plate and the other end of which is connected to the stem of the pinion 19, tends to maintain the pointer at its zero point. The opposite end of the Bourdon tube is connected in a supporting socket 21, suitably secured to the plate 8 by screws. This socket is bored to form a continuous opening and one end of the Bourdon tube is screwed into one end of the opening, the opposite end of the opening being connected by a flexible pipe 24 with the pipe fitting 4. The flexible connection preferably takes the form of a copper or lead pipe and is connected to the socket and fitting as shown. The socket is bored and internally screwthreaded as at 25 and the pipe 24 is passed through a central opening in a threaded nipple 26. The end of the pipe is then swaged over the nipple and the nipple 26 screwed down into the threaded opening 25, thereby securely clamping the swaged end of the pipe in position as shown. This arrangement makes a perfectly secure tight-fitting joint and at the same time permits the ready removal of the parts.

By the interposition of a flexible conduit between the pipe fitting and the Bourdon tube I eliminate a number of the objectionable features heretofore found in pressure gages. Heretofore pressure gages have been constructed in such a manner that the Bourdon tube is rigidly connected directly to and mounted upon the pipe fitting, and I have found in practice that due to this manner of connection the Bourdon tube is strained when the fitting is connected to the pressure pipe and the connection so twisted that the gage is thrown out to such an extent that it will frequently register wrong from five to ten pounds. By the interposition of a flexible connection, as illustrated, no matter how much the pipe fitting is strained in fastening the same to the pressure pipe this strain and twisting out of alinement of the pipe fitting will not affect the Bourdon tube, the strain and twisting action being taken up by the flexible connection 24. Furthermore, it will readily be seen that due to this flexible connection the working parts of the gage may be removed without disconnecting the gage from its pressure pipe. All that is necessary is to remove the outer securing ring 3ª of the casing, take off the top glass, take off the dial plate, and then, by taking out the screws securing the plate 8 in position on the back of the gage, the plate may be readily lifted out, the flexible pipe permitting this without disconnection; or, if desired to entirely remove the mechanism from out of the casing, the flexible pipe may be readily disconnected from the pipe fitting by unscrewing the little nipple 26.

It frequently happens in pressure gages which operate in the open air that the water of condensation settles in the lower bend of the tube when the gage is used for registering steam pressure, and in cold weather freezes. It is almost impossible with the present commercial gage to thaw this gage out except by entirely removing the gage. By the construction illustrated the live steam from the boiler may be blown through the tube and thereby thaw the tube out. Furthermore, by the arrangement shown, before shutting off the steam when the engine is closed down the live steam may be blown through the tube, thereby blowing out the greater part of the water of condensation in the tube so that there will not be sufficient water remaining in the tube to entirely close the tube when frozen.

In the structure illustrated, in addition to the Bourdon tube I provide an interior tube 38 for the Bourdon tube. This tube is preferably made of flexible material and, as shown, is of smaller diameter than the Bourdon tube, extending clear up to the free end thereof. The inner end of the tube 38 is secured in position in the socket piece 21 and connects with the flexible tube 24. It is noticed that the inner end of the tube 38 is swaged over so that it will be clamped in position by the nipple 26 which secures the end of the flexible connection 24 in place. The opposite end of the flexible connection is connected to the pipe fitting 4. In addition to the flexible connection 24 I provide a blow-off connection leading to the atmosphere. The socket piece 21 is provided with an additional port 39, which is connected with a blow-off valve, 40 mounted on the casing, by a flexible connection 41 and provided with a key 42, whereby the same may be opened and closed. In ordinary practice the valve 40 is kept closed, but when it is desired to clean out the water of condensation in the tube the valve 40 is opened and the live steam passing through the Bourdon tube will then blow the water of condensation out through the connection 41 and through the valve 40 to the atmosphere.

I have also provided a spring means for supporting the free end of the Bourdon tube. As this particular form of tube is especially adapted for railway locomotive work, and as in gages of this character the constant jarring of the locomotive tends to cause the free end of the tube to vibrate, thereby causing the indicator of the gage to flicker, I flexibly connect the free end of the tube with a stationary post. In the structure shown this flexible connection consists of a coil spring 43, one end of which is secured to the ear 11 of the Bourdon tube and the other end of which is connected to a stem 44 adapted to pass through a projection 45 and have secured on its opposite end a screw-threaded nut 46. By this arrangement, while the expansion and contraction of the Bourdon tube is not affected, the free end is prevented from rapidly vibrating and causing a flickering of the indicator.

While I have described my gage as being particularly applicable for indicating pressure, it will be understood that the same may be used as a compound gage, or as a vacuum indicating gage, and where I have used the expression "expansion tube" in the claims and in the specification, it will be understood that this is for the purpose of describing the character of the tube rather than the specific function.

While I have illustrated and described certain embodiments of my invention, it will be understood that various modifications and changes may be made therein without departing from the spirit of my invention as embodied in the appended claims.

Having thus described my invention, what I claim as new and desire to secure by Letters Patent is:

1. In a device of the character described, the combination with an expansion tube closed at one end and having a normally closed opening to the atmosphere at its opposite end, of a second tube arranged within said expansion tube and extending substantially the entire length of the tube, having one end opening in the expansion tube and the other end connected with the pressure supply.

2. In a gage, the combination with an expansion tube closed at one end and having a valve-controlled opening at the other end opening to the atmosphere, of a second tube arranged within said expansion tube and extending substantially the entire length of the expansion tube, one end thereof opening in the expansion tube and the other end being connected with the pressure supply pipe.

3. In a gage, the combination with a connection fitting, of an expansion tube and indicating mechanism, a valve opening to the atmosphere, a flexible conduit extending between said valve and expansion tube, a second tube arranged within said expansion tube of substantially the same length as the expansion tube, one end thereof opening in the expansion tube, and a flexible connection between said connection fitting and said second tube.

4. In a gage, the combination with a casing, of a connection fitting mounted on said casing, a Bourdon tube and an indicating mechanism arranged within said casing, a second tube of substantially the same length as the expansion tube arranged within said expansion tube and having one end opening within the expansion tube. a flexible conduit connection extending between said second tube and the connection fitting, a valve mounted on said casing opening to the atmosphere, and a flexible conduit connection extending between said valve and the expansion tube.

In witness whereof, I have hereunto subscribed my name in the presence of two witnesses.

THOMAS A. NELSON.

Witnesses:
E. R. KING,
W. PERRY HAHN.